(12) United States Patent
Machida

(10) Patent No.: US 7,191,054 B2
(45) Date of Patent: Mar. 13, 2007

(54) FAIL-SAFE CONTROL APPARATUS FOR INTERNAL COMBUSTION ENGINE EQUIPPED WITH VARIABLE VALVE CHARACTERISTIC MECHANISMS AND METHOD THEREOF

(75) Inventor: Kenichi Machida, Atsugi (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 0 days.

(21) Appl. No.: 10/873,139

(22) Filed: Jun. 23, 2004

(65) Prior Publication Data

US 2005/0027432 A1    Feb. 3, 2005

(30) Foreign Application Priority Data

Jun. 25, 2003    (JP)    ............... 2003-181091

(51) Int. Cl.
  *F02D 41/22*    (2006.01)

(52) U.S. Cl. ................... 701/114; 123/90.15

(58) Field of Classification Search .................... None
See application file for complete search history.

(56) References Cited

U.S. PATENT DOCUMENTS 6,513,469 B2 *    2/2003    Nakamura et al. ....... 123/90.15

FOREIGN PATENT DOCUMENTS

JP    2000-110594 A    4/2000
JP    2001-065321 A    3/2001

* cited by examiner

*Primary Examiner*—Andrew M. Dolinar
(74) *Attorney, Agent, or Firm*—Foley & Lardner LLP

(57) ABSTRACT

When any one of a plurality of variable valve characteristic mechanisms which vary different operating characteristics of an intake valve is failed, a limit which is capable of satisfying predetermined conditions for a change in opening timing of the intake valve at the time when the other operating characteristic is varied by the normally operating variable valve characteristic mechanism, is set and the operating characteristics of the intake valve are controlled while limiting the intake valve opening timing by the limit, by the normally operating variable valve characteristic mechanism.

14 Claims, 12 Drawing Sheets

(A)

(B)

(A)

(B)

FAIL-SAFE CONTROL APPARATUS FOR INTERNAL COMBUSTION ENGINE EQUIPPED WITH VARIABLE VALVE CHARACTERISTIC MECHANISMS AND METHOD THEREOF

FIELD OF THE INVENTION

The present invention relates to a fail-safe control technique for when, in an internal combustion engine equipped with a plurality of variable valve characteristic mechanisms which vary different operating characteristics of an intake valve, one of the variable valve characteristic mechanisms is failed.

RELATED ART OF THE INVENTION

Japanese Unexamined Patent Publication No. 2001-65321 discloses a technique in which there are provided a first variable valve characteristic mechanism (variable valve timing mechanism) which varies valve timing (valve opening/closing timing) of an intake valve and a second variable valve characteristic mechanism (variable valve lift mechanism) which continuously varies a lift amount of the intake valve.

In this technique, in the case where one of the variable valve characteristic mechanisms is failed, operating characteristics of the intake valve are fail-safe controlled by the other normal variable valve characteristic mechanism within a range of noninterference with a piston, thereby enabling a fail-safe running while preventing the breakage of the engine due to the piston interference.

However, when the normal variable valve characteristic mechanism is fail-safe controlled within the range of non-interference with the piston, if the intake valve opening timing (IVO) is too advanced, an overlap amount of the intake valve with an exhaust valve becomes larger, and thus a remaining burned gas amount (so-called internal EGR amount) is increased. Therefore, it becomes impossible to ensure the combustion stability, resulting in the further deterioration of drivability.

On the other hand, if the intake valve opening timing is too retarded at the deceleration time, an engine oil amount, which is sucked into a cylinder to be consumed due to the rise of cylinder negative pressure, is increased, and there occurs an engine oil loss, causing damage to the engine.

SUMMARY OF THE INVENTION

It is therefore an object of the present invention to make it possible that, when one of a plurality of variable valve characteristic mechanisms which vary different operating characteristics of an intake valve, is failed, the other normal variable valve characteristic mechanism is appropriately controlled, to suppress the deterioration of drivability and an oil loss to a minimum while preventing the piston interference.

In order to accomplish the above object, the present invention is constructed so that, in an internal combustion engine equipped with a plurality of variable valve characteristic mechanisms which vary different operating characteristics of an intake valve, it is detected whether or not the plurality of variable valve characteristic mechanisms is failed, and when it is detected that the variable valve characteristic mechanism which varies one of the operating characteristics is failed, a limit which is capable of satisfying predetermined conditions for a change in opening timing of the intake valve at the time when the other operating characteristic is varied by the normally operating variable valve characteristic mechanism, is set, and the operating characteristics of the intake valve are controlled while limiting the opening timing of the intake valve by the limit, by the normally operating variable valve characteristic mechanism.

The other objects and features of the invention will become understood from the following description with reference to the accompanying drawings.

DESCRIPTION OF THE PREFERRED EMBODIMENT

Figure 1:
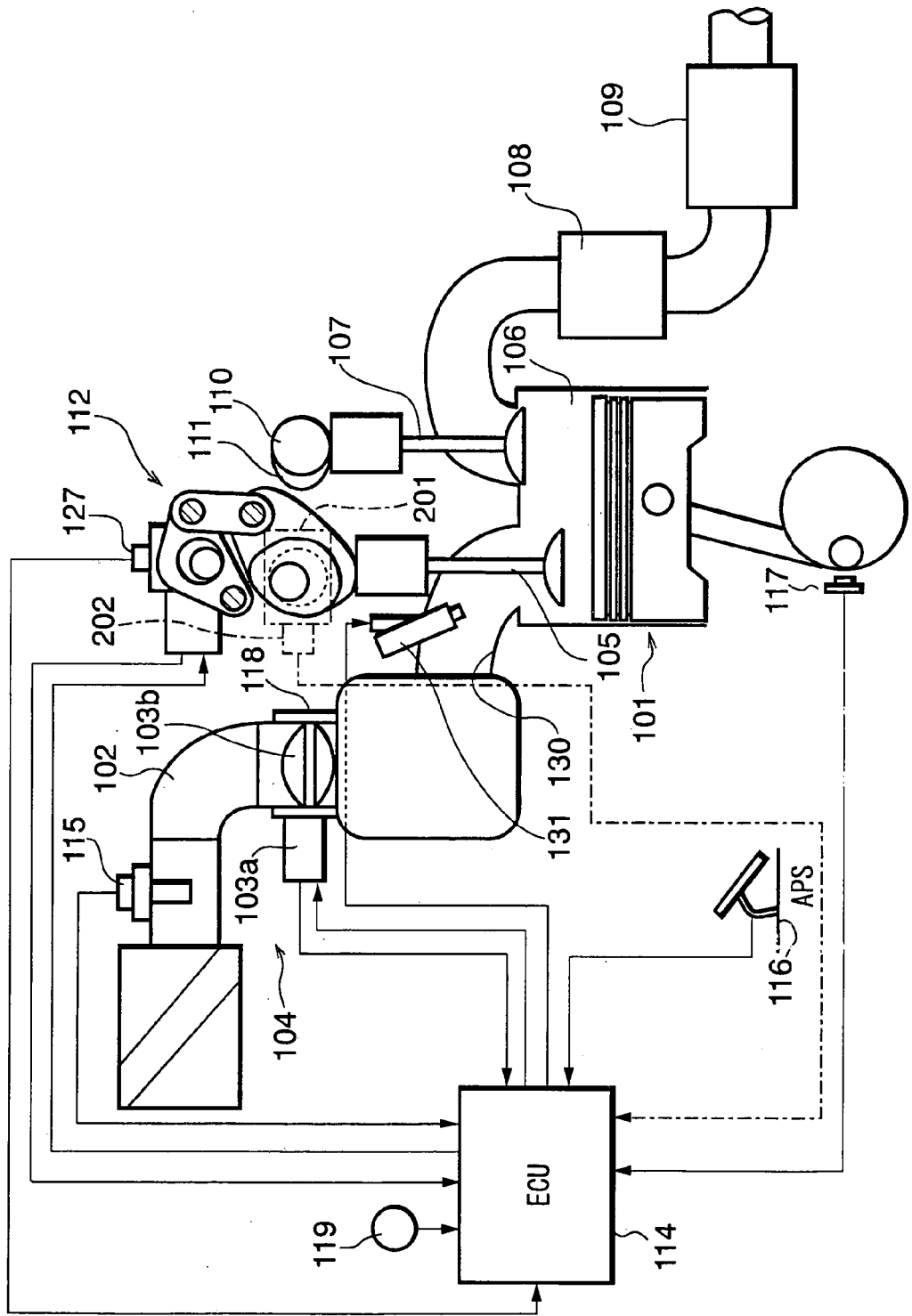
FIG. 1 is a diagram of a system structure of a fail-safe control apparatus for an internal combustion engine equipped with variable valve characteristic mechanisms in an embodiment of the present invention.

In an intake pipe 102 of an internal combustion engine 101, an electronically controlled throttle 104 is disposed for driving a throttle valve 103*b* to open and close by a throttle motor 103*a*, and air is sucked into a combustion chamber 106 via electronically controlled throttle 104 and an intake valve 105.

A combusted exhaust gas discharged from combustion chamber 106 via an exhaust valve 107 is purified by a front catalyst 108 and a rear catalyst 109, and then emitted into the atmosphere.

Exhaust valve 107 is driven by a cam 111 axially supported by an exhaust side camshaft 110, to open and close at a fixed valve lift amount and valve operating angle (crank angle of from opening to closing). A valve lift amount and an operating angle of intake valve 105 are varied continuously by a variable valve lift mechanism 112. Note, the valve lift amount and the operating angle are varied simultaneously so that, when a characteristic of one of the valve lift amount and the operating angle is determined, a characteristic of the other is also determined.

On an intake side, a variable valve timing mechanism 201 constituted by a mechanism which continuously and variably controls a rotation phase difference between a crankshaft and an intake side camshaft, to advance or retard valve timing (valve opening/closing timing) of intake valve 105, and an intake side cam angle sensor 202 for detecting a rotation position of the intake side camshaft, are disposed on both end portions of the intake side camshaft. As described above, variable valve lift mechanism 112 and variable valve timing mechanism 201 are provided as a plurality of variable valve characteristic mechanisms, which respectively varies the lift amount (operating angle) and the valve timing, being different operating characteristics of intake valve 105.

A control unit 114 incorporating therein a microcomputer controls electronically controlled throttle 104, variable valve lift mechanism 112 and variable valve timing mechanism 201, according to an accelerator pedal opening detected by an accelerator opening sensor APS 116 and the like, so that a target intake air amount corresponding to an accelerator opening ACC can be obtained based on an opening of throttle valve 103b and an opening characteristic of intake valve 105.

Control unit 114 receives various detection signals from an airflow meter 115 detecting an intake air amount Q of engine 101, a crank angle sensor 117 taking a rotation signal out of the crankshaft, a throttle sensor 118 detecting an opening TVO of throttle valve 103b, a water temperature sensor 119 detecting a cooling water temperature Tw of engine 101 and the like, in addition to accelerator opening sensor APS 116, a rotation angle sensor 127 (to be described later) and intake side cam angle sensor 202.

Further, an electromagnetic fuel injection valve 131 is disposed on an intake port 130 at the upstream side of intake valve 105 of each cylinder. Fuel injection valve 131 injects fuel adjusted at a predetermined pressure toward intake valve 105, when driven to open by an injection pulse signal from control unit 114.

Figure 2:
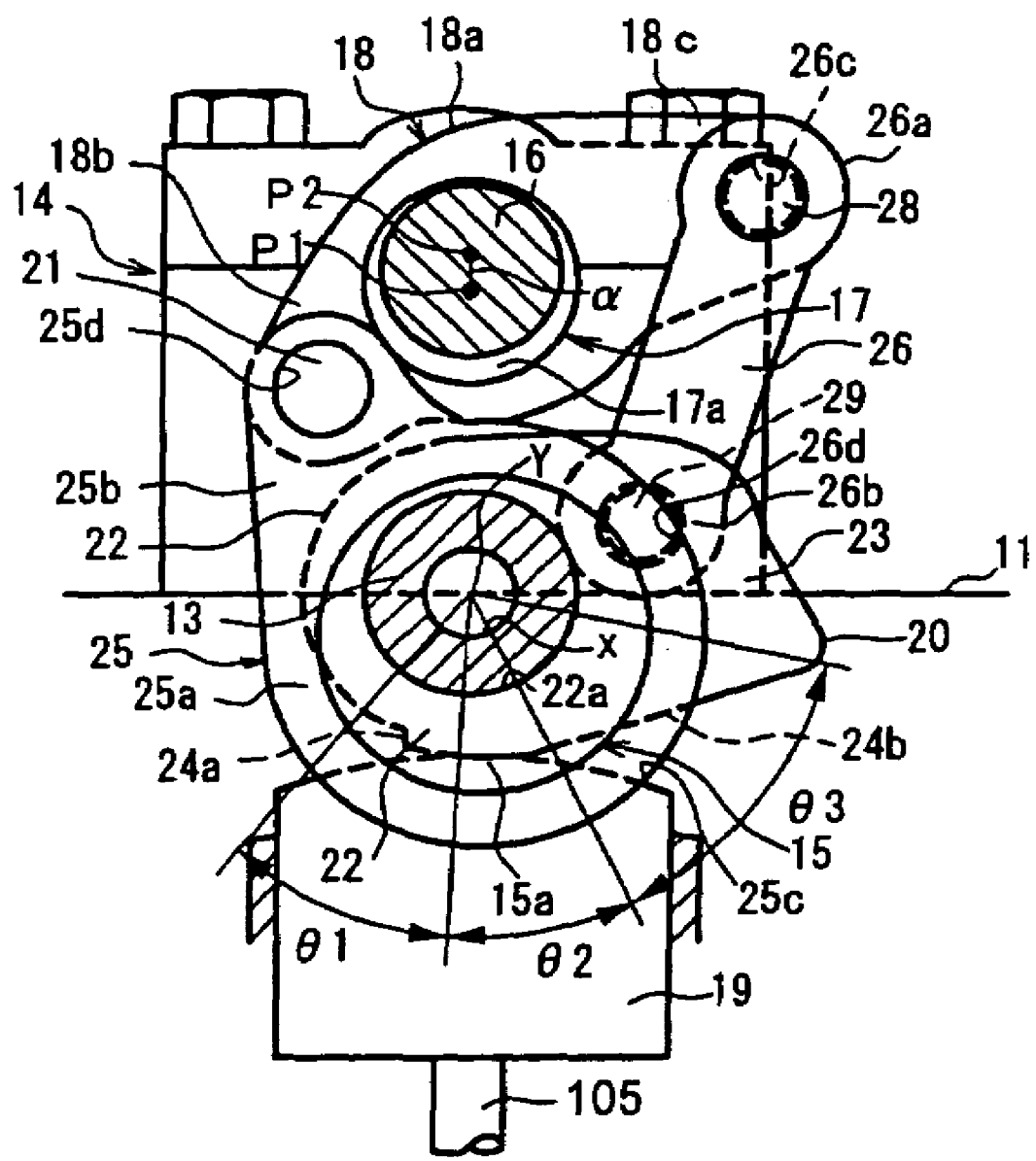
FIG. 2 is a cross section view showing a variable valve characteristic mechanism in the embodiment (A—A cross section view in FIG. 3).
Figure 3:
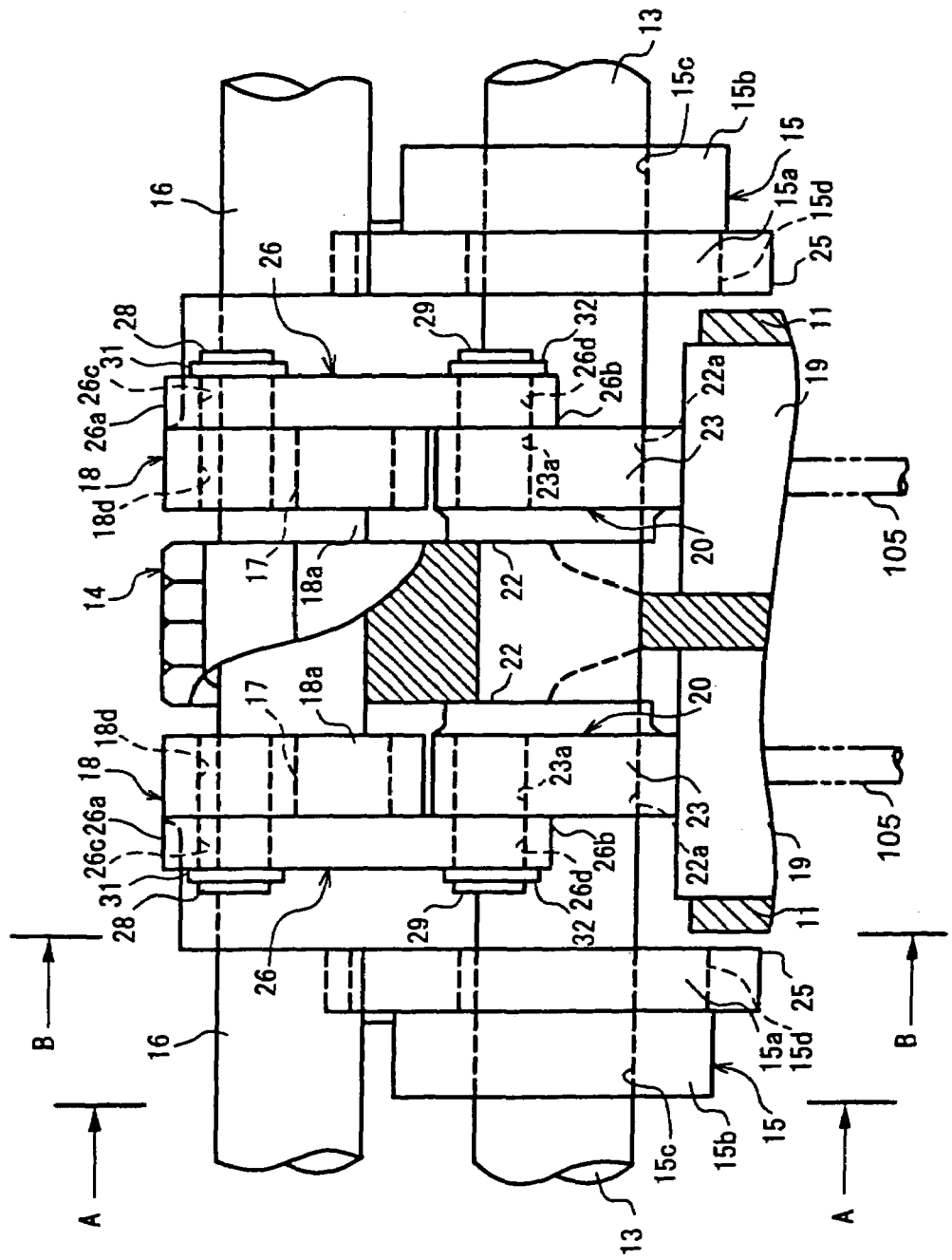
FIG. 3 is a side elevation view of the variable valve characteristic mechanism.
Figure 4:
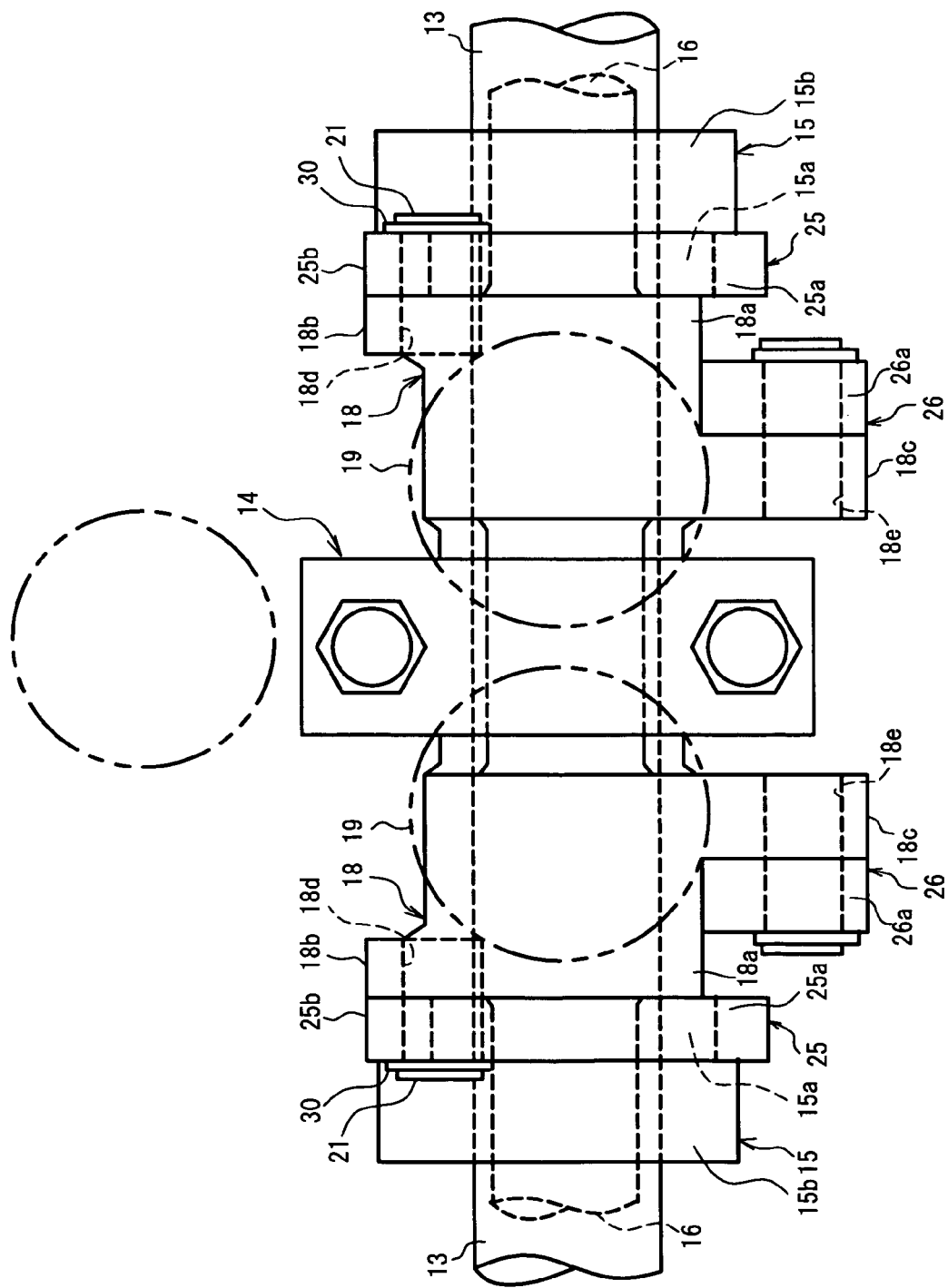
FIG. 4 is a top plan view of the variable valve characteristic mechanism.

FIG. 2 to FIG. 4 show in detail the structure of variable valve lift mechanism 112.

Variable valve lift mechanism 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19,19, respectively.

Eccentric cams 15,15 are connected with rocker arms 18,18 by link arms 25, 25, respectively. Rocker arms 18,18 are connected with swing cams 20, 20 by link members 26, 26.

Rocker arms 18, 18, link arms 25, 25, and link members 26, 26 constitute a transmission mechanism.

Figure 5:
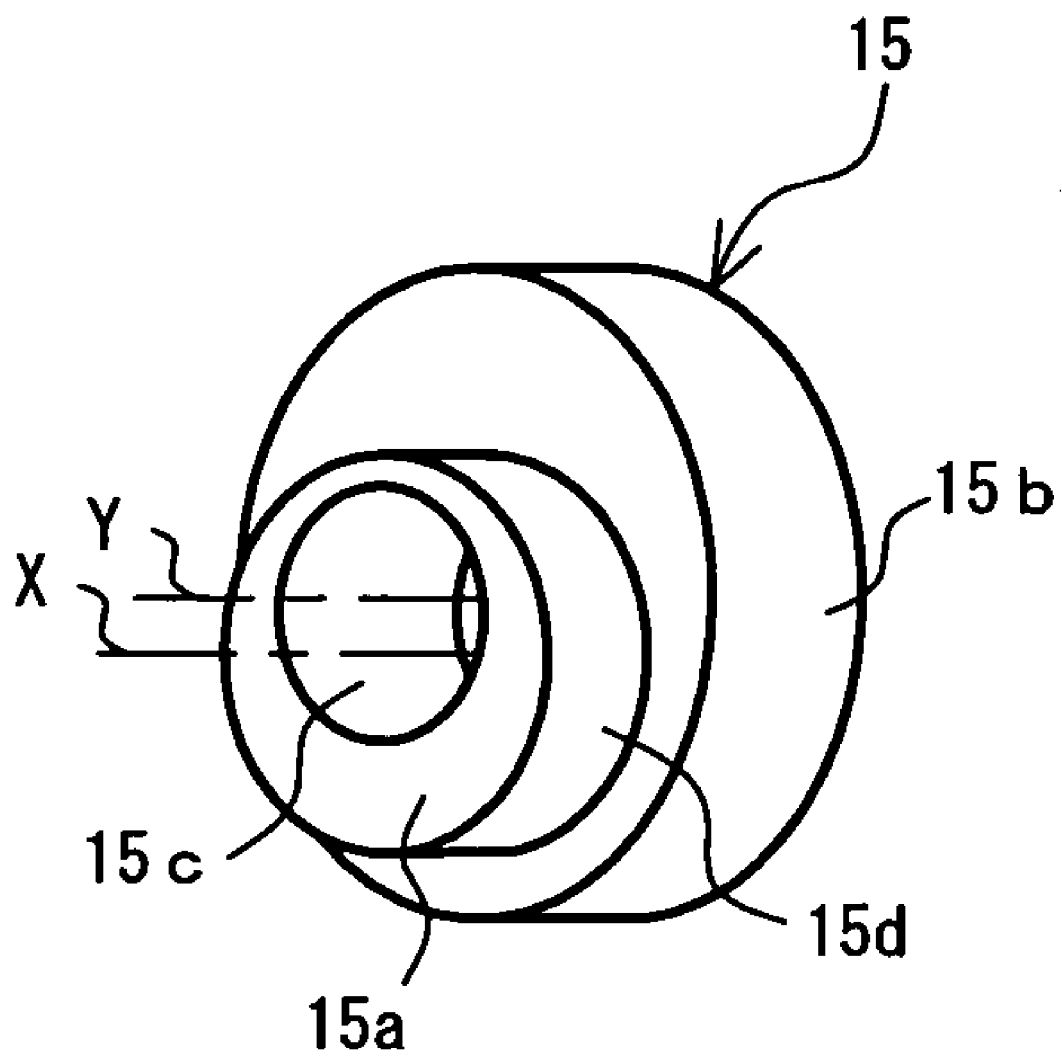
FIG. 5 is a perspective view showing an eccentric cam for use in the variable valve characteristic mechanism.

Each eccentric cam 15, as shown in FIG. 5, is formed in a substantially ring shape and includes a cam body 15a of small diameter, a flange portion 15b integrally formed on an outer surface of cam body 15a. An insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively, so as not to interfere with valve lifters 19, 19. Also, outer peripheral surfaces 15d, 15d of cam body 15a are formed in the same cam profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
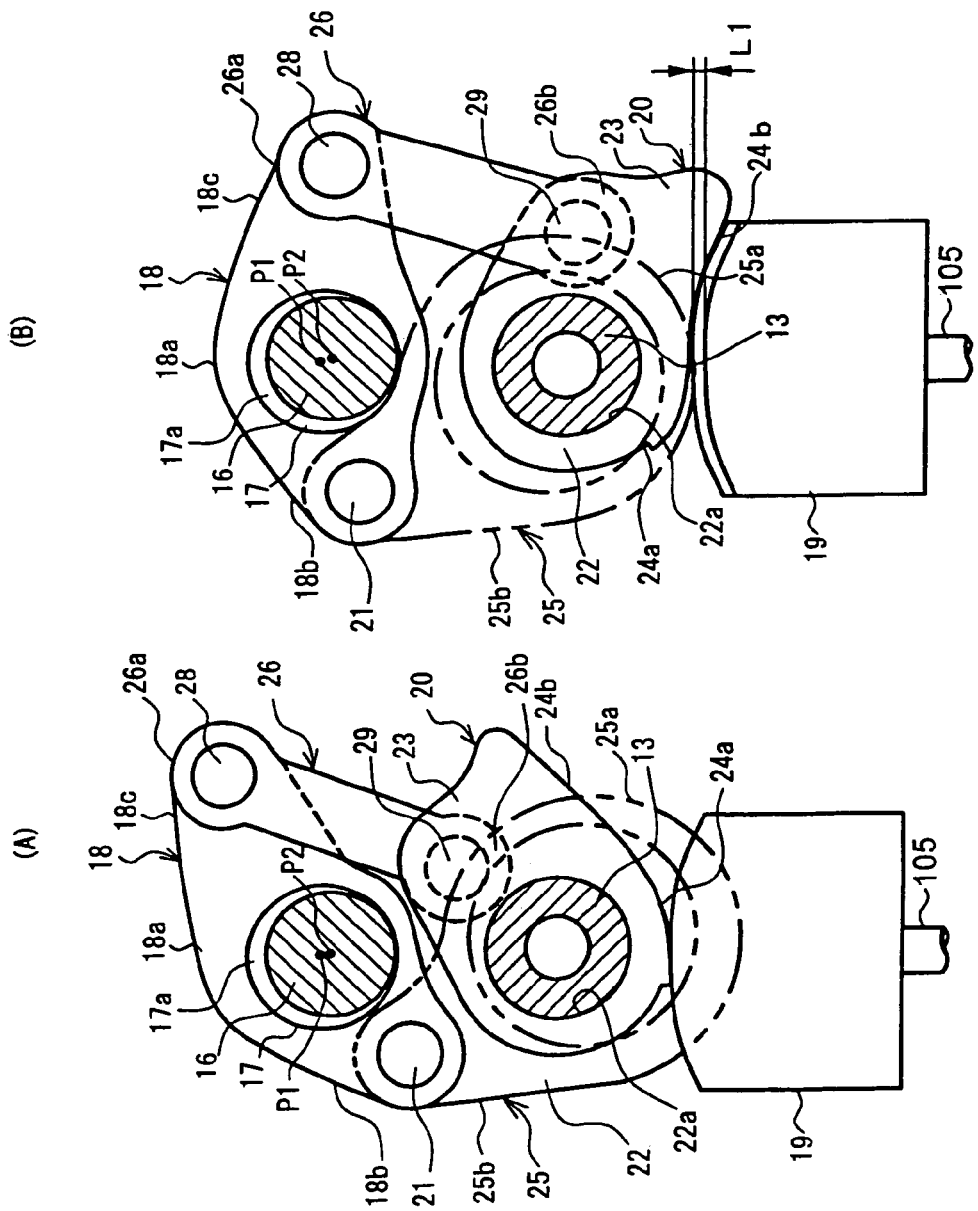
FIG. 6 is a cross section view showing an operation of the variable valve characteristic mechanism at a low lift condition (B—B cross section view of FIG. 3).
Figure 7:
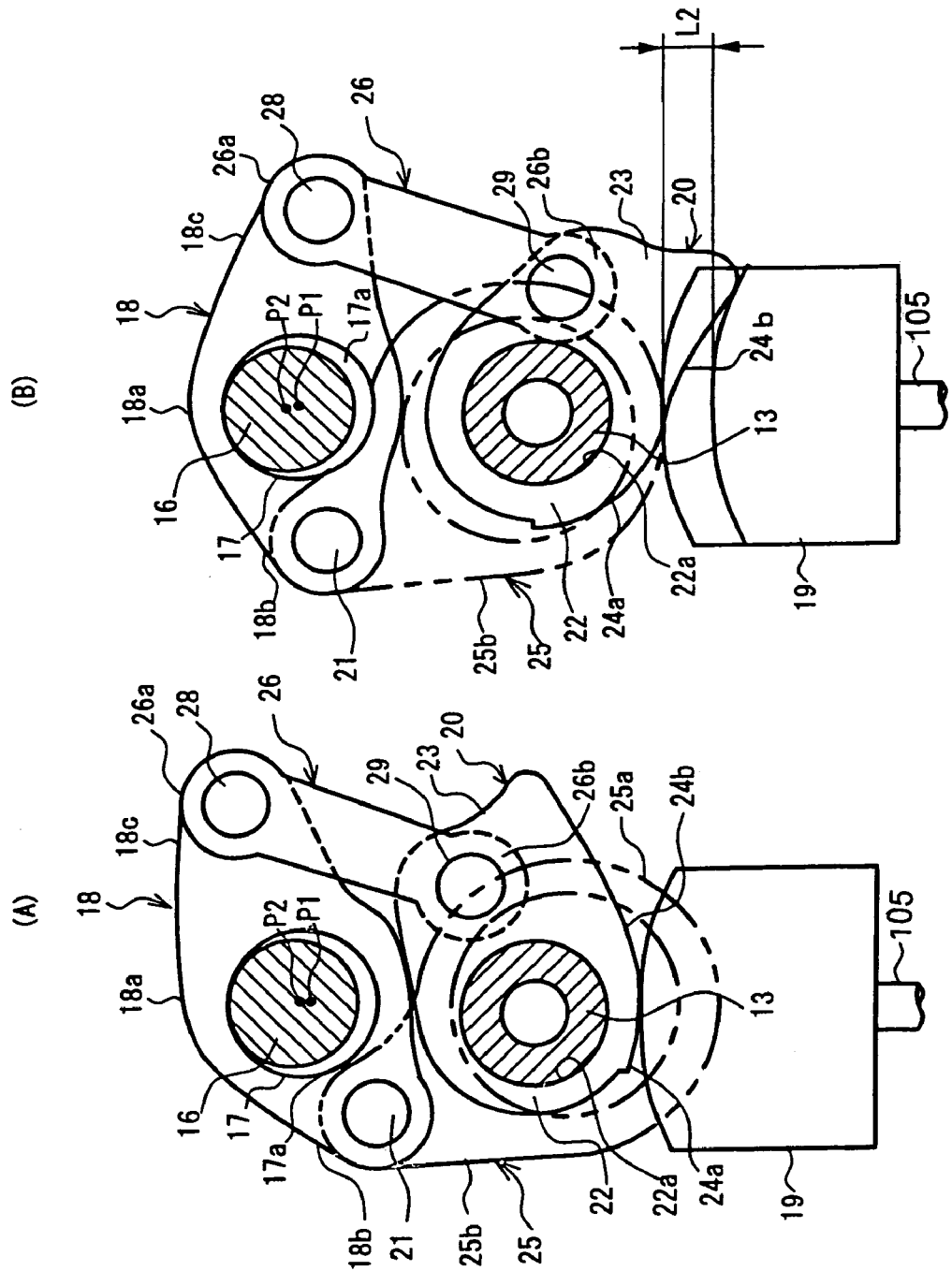
FIG. 7 is a cross section view showing an operation of the variable valve characteristic mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
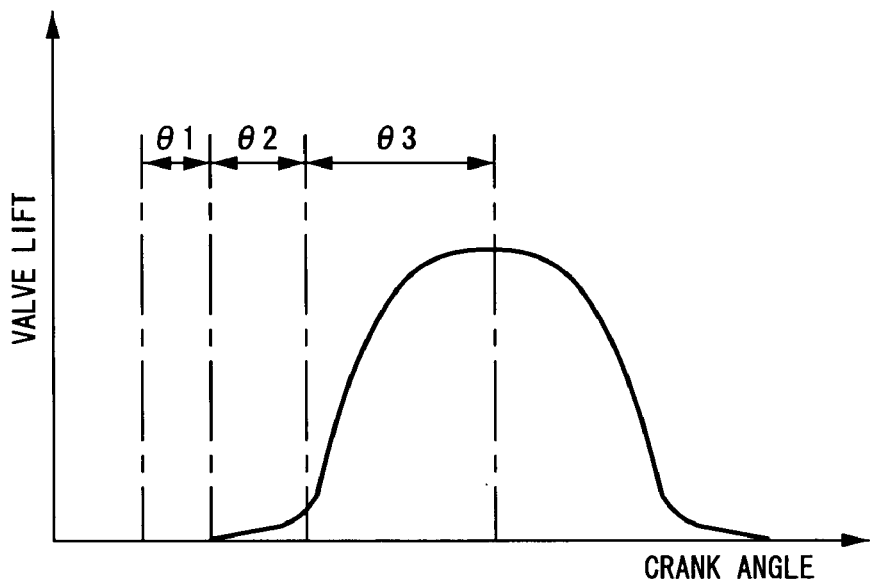
FIG. 8 is a valve lift characteristic diagram corresponding to a base end face and a cam surface of a swing cam in the variable valve characteristic mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
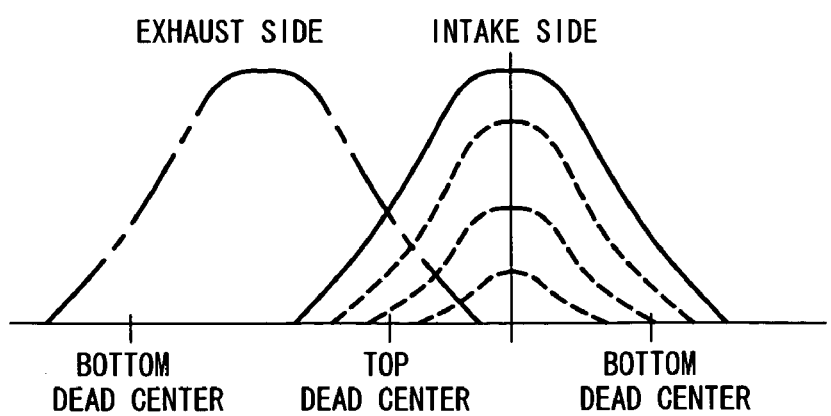
FIG. 9 is a characteristic diagram showing valve timing and a valve lift of the variable valve characteristic mechanism.
Figure 10:
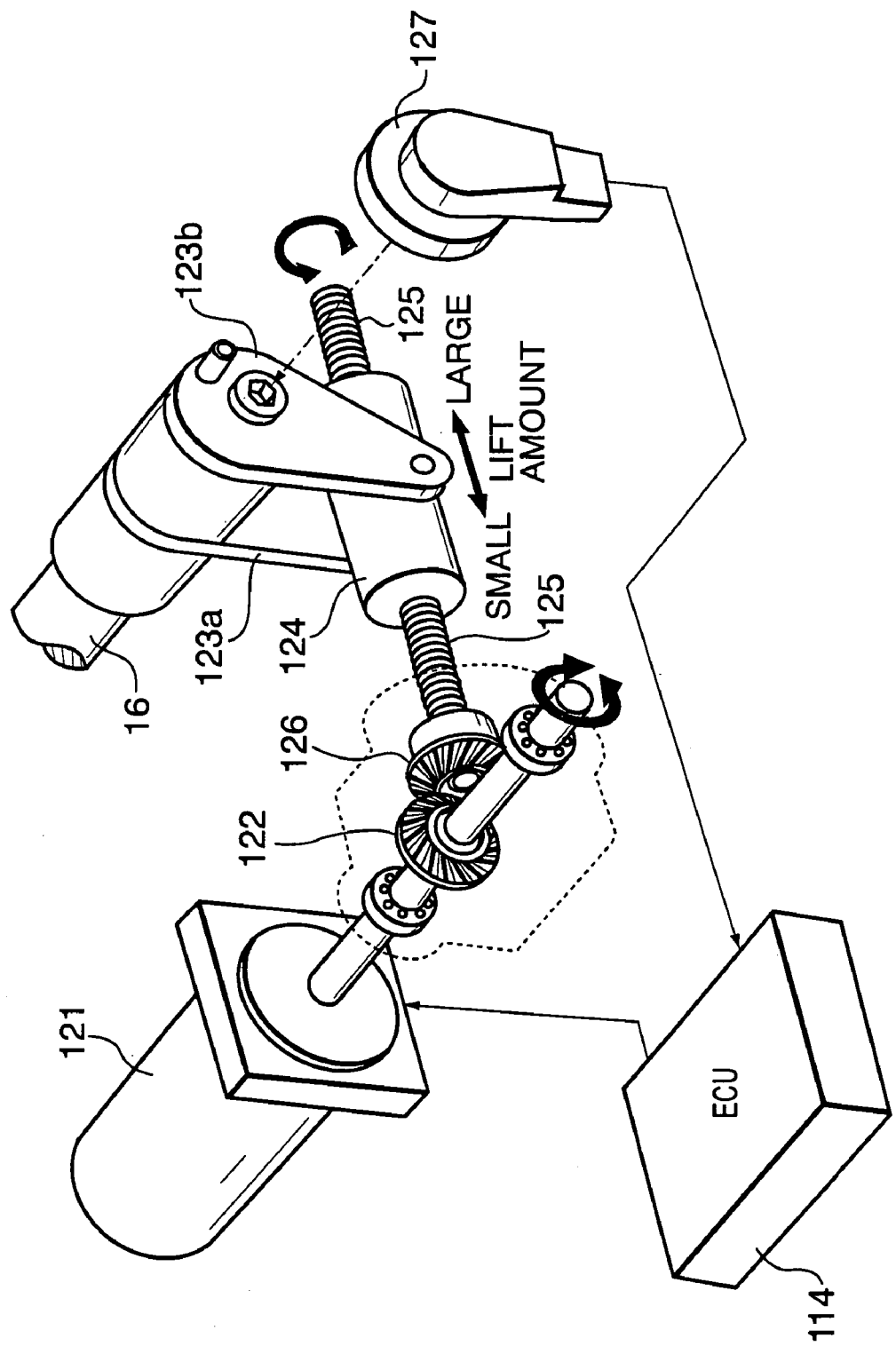
FIG. 10 is a perspective view showing a rotational driving mechanism of a control shaft in the variable valve characteristic mechanism.

Control shaft 16 is driven to rotate within a predetermined rotation angle range by a DC servo motor (actuator) 121 as shown in FIG. 10. By varying a rotation angle of control shaft 16 by actuator 121, the valve lift amount and valve operating angle of each of intake valves 105, 105 are continuously varied (refer to FIG. 9).

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, potentiometer type rotation angle sensor 127 detecting the rotation angle of control shaft 16 is disposed on the tip end of control shaft 16, as shown in FIG. 10. Control unit 114 feedback controls DC servo motor 121 so that an actual rotation angle detected by rotation angle sensor 127 coincides with a target rotation angle. Here, since the lift amount and the operating angle are varied simultaneously by a rotation angle control of control shaft 16, rotation angle sensor 127 detects the operating angle and at the same time detects the lift amount.

The operating characteristics of intake valve 105 are varied by such variable valve characteristic mechanisms, to control an intake amount. In the present invention, when one of variable valve lift mechanism 112 and variable valve timing mechanism 201 being two types of variable valve characteristic mechanisms, is failed, intake valve 105 is fail-safe controlled by the other normal variable valve characteristic mechanism, thereby preventing the interference between intake valve 105 and a piston, the deterioration of combustion stability due to an increase of remaining burned gas amount, and an engine oil loss due to an increase of cylinder negative pressure, to enable the fail-safe running while preventing an engine damage.

Figure 11:
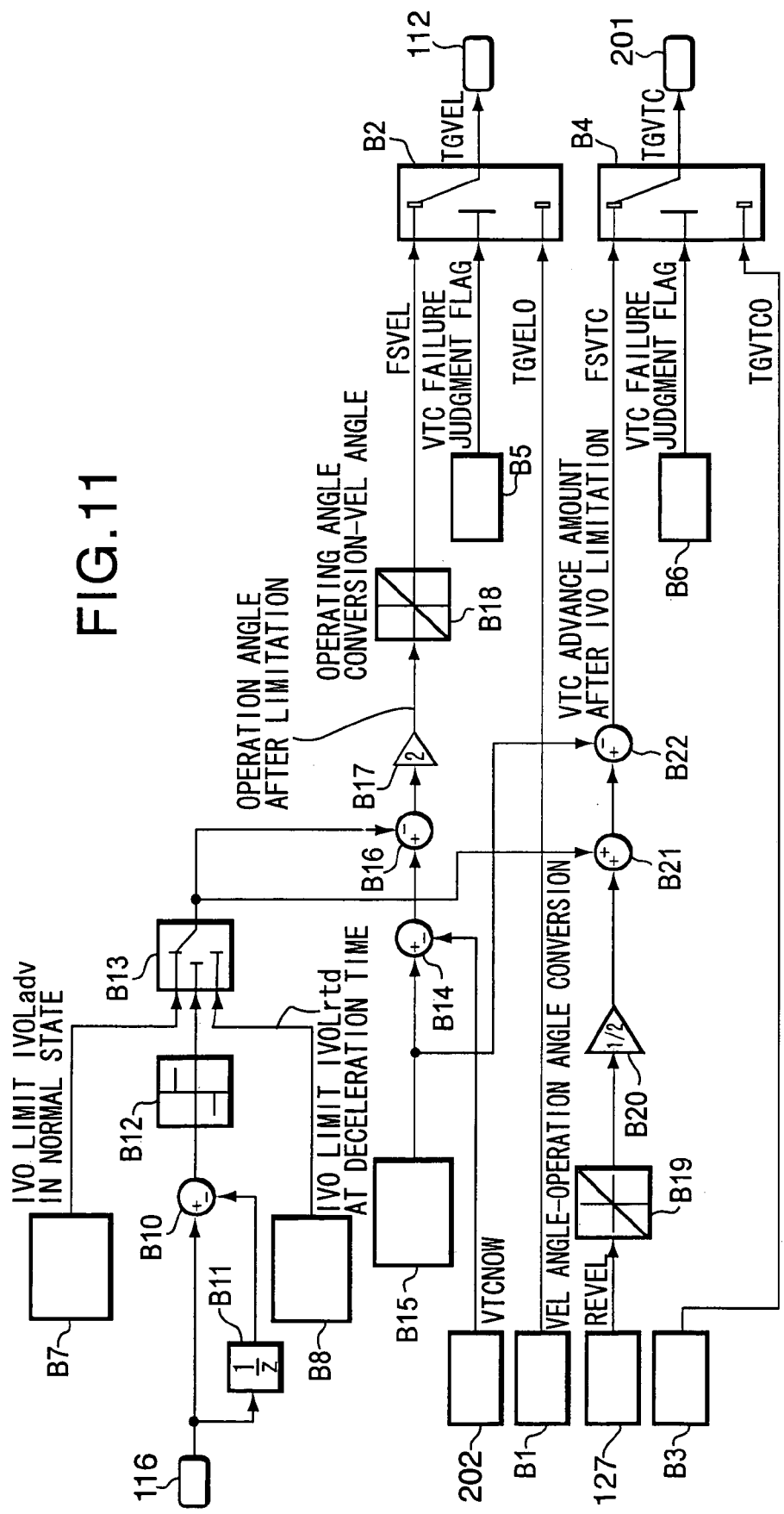
FIG. 11 is a block diagram showing the intake valve control in the embodiment.

A control of intake valve 105 by control unit 114 will be described in accordance with a block diagram of FIG. 11.

In block B1, basic controlled variable (rotation angle of control shaft 16) TGVEL0 of variable valve lift mechanism 112 corresponding to a target operating angle of intake valve 105, at which a target torque can be obtained, is set based on the accelerator opening ACC detected by accelerator opening sensor 116 and an engine rotation speed Ne detected by crank angle sensor 117, to be output to block B2.

In block B3, basic controlled variable TGVTC0 of variable valve timing mechanism 201 corresponding to target valve timing of intake valve 105, at which the target torque can be obtained, is set based on the accelerator opening ACC and the engine rotation speed Ne, to be output to block B4.

In block B5, it is diagnosed whether or not variable valve timing mechanism 201 is failed (fixed), and a diagnosis result (VTC failure judgment flag) is output to block B2.

In block B2, if it is judged in block B5 that variable valve timing mechanism 201 is normal, the basic controlled variable TGVEL0 of variable valve lift mechanism 112 set in block B1 is output just as it is, as target controlled variable TGVEL. If it is judged that variable valve timing mechanism 201 is failed, fail-safe controlled variable FSVEL of variable valve lift mechanism 112 set in each block (to be described below) is output as the target controlled variable TGVEL.

In block B6, it is diagnosed whether or not variable valve lift mechanism 112 is failed (fixed), and a diagnosis result (VEL failure judgment flag) is output to block B4.

In block B4, if it is judged in block B6 that variable valve lift mechanism 112 is normal, the target valve timing TGVTC0 of variable valve timing mechanism 201 set in block B3 is output just as it is, as target valve timing TGVTC. If it is judged that variable valve lift mechanism 112 is failed, fail-safe controlled variable FSVTC of variable valve timing mechanism 201 set in each block (to be described below) is output as the target controlled variable TGVTC.

The description will be made on blocks for executing a fail-safe control by the normal variable valve characteristic mechanism at the time when one of the variable valve characteristic mechanisms is failed.

Blocks B7 to B13 are for setting opening timing IVO of intake valve 105, which is set commonly for the cases where either of variable valve characteristic mechanisms are failed.

In block B7, an advance limit IVOLadv is set as a limit value in advancing of the valve opening timing IVO, at which the remaining burned gas amount due to overlap of intake valve 105 with exhaust valve 107 in a normal state (non-deceleration time) can be maintained at a reference value or less, to be output to block B13. To be specific, the advance limit IVOLadv is set to be in the vicinity of intake top dead center (for example, if a crank angle position of intake top dead center=360°, 380° slightly retarded side of 360°). The advance limit IVOLadv is set to be on the retarded side of an advance limit at which the interference between intake valve 105 and the piston can be prevented.

In block B8, a retard limit IVOLrtd is set as a limit value in retarding the valve opening timing IVO, at which cylinder negative pressure can be maintained at a predetermined value or less at the deceleration time, to be output to block B13. Here, the retard limit IVOLrtd at the deceleration time can be set in advance based on an experiment, as valve opening timing, at which the cylinder negative pressure does not reach the predetermined value or above (for example, an absolute pressure, −650 mmHg or less). The retard limit IVOLrtd is set to be on the retarded side of the advance limit at which the interference between intake valve 105 and the piston can be prevented. Note, if the operating angle and the lift amount cannot be increased since the center of actual operating angle at the failed time is positioned on the advance side, the cylinder negative pressure is likely to be increased compared with the case where the lift amount is large, and therefore, the retard limit IVOLrtd may be set to be on the further retarded side.

In block B10, a difference between a present value of the accelerator opening APS detected by accelerator opening sensor 116 and a previous value output from block B11, is calculated. In block B12, it is judged whether or not it is the deceleration time, based on whether the difference is positive or negative (if the present value−previous value<0, it is judged that it is the deceleration time).

In block B13, based on a judgment result in block B10, the advance limit IVOLadv set at the intake top dead center is output at the non-deceleration time, while the retard limit IVOLrtd set at the angle where the cylinder negative pressure does not reach the predetermined value or above is output at the deceleration time. Namely, the cylinder negative pressure is unlikely to be increased at the non-deceleration time, compared with the deceleration time, and the retard limit at which the cylinder negative pressure reaches the predetermined value or above, is positioned on the retarded side of the advance limit IVOLadv at which the remaining burned gas is limited. Therefore, the advance limit IVOLadv is selected as fail-safe controlled variable at the valve opening timing, so as to ensure the power by advancing the valve opening timing to the advance limit IVOLadv. On the other hand, at the deceleration time in the low power or no-power (fuel cut-off) state, the remaining burned gas amount is not a problem but the engine oil loss is a problem. Therefore, the retard limit IVOLrtd is selected so that the valve opening timing is advanced to the retard limit IVOLrtd at the deceleration time.

Then, at the time when one of the variable valve characteristic mechanisms is failed. The opening timing IVO of intake valve 105 is controlled to the advance limit IVOLadv or the retard limit IVOLrtd set in the above manner by the other normal variable valve characteristic mechanism.

Firstly, the description will be made on the blocks for setting the fail-safe controlled variable of variable lift mechanism 112 at the time when variable valve timing mechanism 201 is failed.

In block B14, advance controlled variable VTCNOW output from block B15 is subtracted from an operating angle center (crank angle position which is intermediate between the opening timing and closing timing, for example 470° in the case of intake top dead center=360°) VTC0 of intake valve 105, which is most retarded in a state where the operation of variable valve timing mechanism 201 stops, output from block B15, to calculate an actual operating angle center (crank angle position) NGVTC of intake valve 105 in variable valve timing mechanism 201, which is fixed due to the failure.

In block B16, the crank angle position equivalent to the advance limit IVOLadv or the retard limit IVOLrtd from block B13 is subtracted from the actual operating angle center NGVTC at the time when variable valve timing mechanism 201 is failed.

The crank angle calculated in block B16 is equivalent to a half the operating angle of intake valve 105. Therefore, in block B17, the calculated crank angle is multiplied by a gain of two times to calculate the operating angle, and thereafter, in block B18, the operating angle is converted into the controlled variable (rotation angle of control shaft 16) of variable valve lift mechanism 112 to be output to block B2 as the fail-safe controlled variable FSVEL.

At the time when variable valve timing mechanism 201 is failed, since the fail-safe controlled variable FSVEL is output to variable valve lift mechanism 112 as the target controlled variable TGVEL from block B2 as described in the above, the operating angle and the lift amount are controlled so that the opening timing IVO of intake valve 105 is made to be the advance limit IVOLadv in the vicinity of the top dead center in the normal state, while at the deceleration time, to be the retard limit IVOLrtd at which the cylinder negative pressure does not reach the predetermined value or above.

Figure 12:
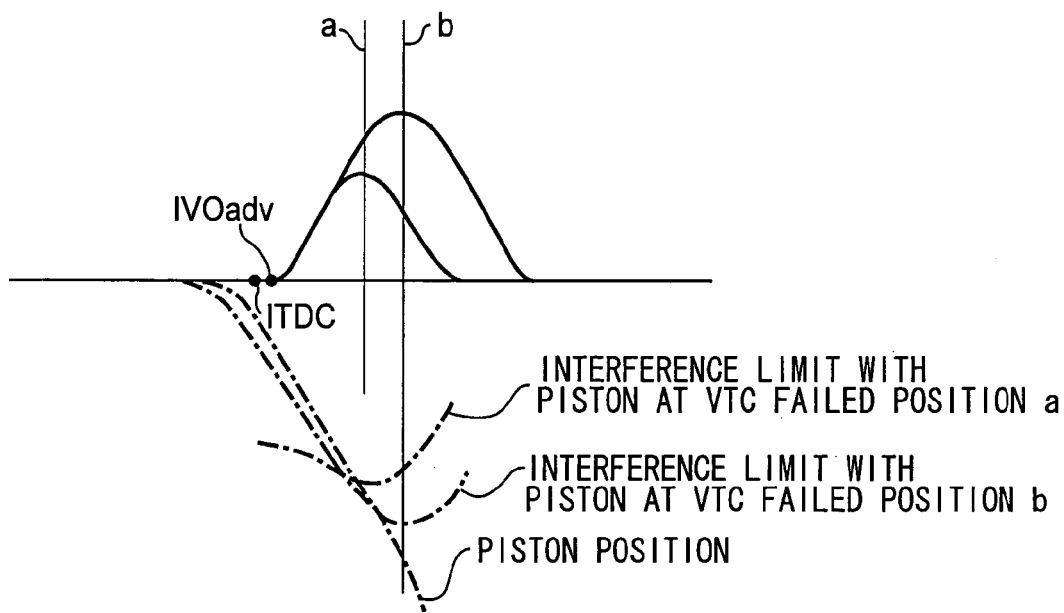
FIGS. 12(A) and (B) are diagrams showing the intake valve control by a variable valve lift mechanism at the time when a variable valve timing mechanism is failed, in the embodiment.
Figure 12:
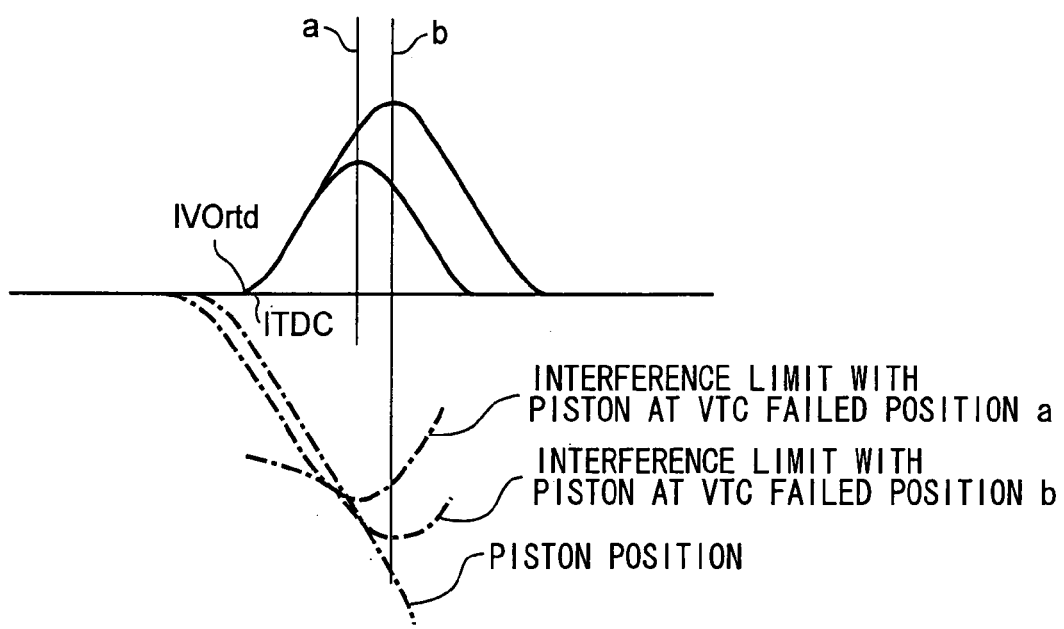

FIG. 12 shows the fail-safe control by variable valve lift mechanism 112 at the time when variable valve timing mechanism 201 is failed.

For example as shown in (A), in the case where the operating angle center NGVTC at the time when variable valve timing mechanism 201 is failed is positioned on either "a" or "b", the advance limit of valve opening timing IVO in the range where the intake valve does not interfere with the piston is on the advanced side of the intake top dead center ITDC. However, if the valve opening timing is advanced to the advance limit, the remaining burned gas amount due to the overlap of the intake valve with the exhaust valve is increased to deteriorate the combustion stability, so that a fail-safe operation becomes substantially difficult. Therefore, by controlling the operating angle of intake valve 105 by variable valve lift mechanism 112 so that the valve opening timing IVO is limitedly advanced to the advance limit IVOLadv, the remaining burned gas amount can be maintained at the reference value or less while preventing the interference of the intake valve with the piston, to ensure the combustion stability satisfactorily, thereby enabling the fail-safe operation. Note, by advancing the valve opening timing to the advance limit IVOLadv, the lift amount can be increased as large as possible to ensure the power.

On the other hand, as shown in (B), the target lift amount of intake valve 105 is set to be rather small at the deceleration time. However, if the operating angle center NGVTC at the time when variable valve timing mechanism 201 is failed is on the retarded side, the valve opening timing IVO is too retarded to increase the cylinder negative pressure, thereby leading a possibility of the engine oil loss. Therefore, by forcibly advancing the valve opening timing IVO to the retard limit IVOLrtd by variable valve lift mechanism 112, the cylinder negative pressure can be held at the predetermined value or less while preventing the interference of the intake valve with the piston, to reliably prevent the engine oil loss, thereby enabling the fail-safe operation.

Next, the description will be made on the blocks for setting the fail-safe controlled variable of variable valve timing mechanism 201 at the time when variable valve lift mechanism 112 is failed.

In block B19, the actual rotation angle REVEL of control shaft 16 detected by rotation angle sensor 127 is converted into the actual operating angle REEVENT of intake valve 105.

In block B20, the actual operating angle REEVENT is multiplied with a half the gain, to calculate the crank angle of from the actual operating angle center to the actual valve opening timing.

In block B21, the calculated value is added with the valve opening timing IVO (advance limit IVOLadv or retard limit IVOLrtd) from block B13, to calculate a target value (crank angle position) of the operating angle center corresponding to the target valve opening timing.

In block B22, the operating angle center VTC0 in the state where the operation of variable valve timing mechanism 201 stops from block B15 is subtracted from the target value of the operating angle center, to calculate controlled variable of variable valve timing mechanism 201 as a negative value (advance amount), and this controlled variable is output to block B4 as the fail-safe controlled variable FSVTC.

At the time when variable valve lift mechanism 112 is failed, as described in the above, the fail-safe controlled variable FSVTC is output from block B4 to variable valve timing mechanism 201 as the target controlled variable TGVTC. Therefore, the valve timing is controlled, so that the opening timing IVO of intake valve 105 is made to be the advance limit IVOLadv in the vicinity of the top dead center in the normal state (non-deceleration time), while at the deceleration time, to be the retard limit IVOLrtd at which the cylinder negative pressure does not reach the predetermined value or above.

Figure 13:
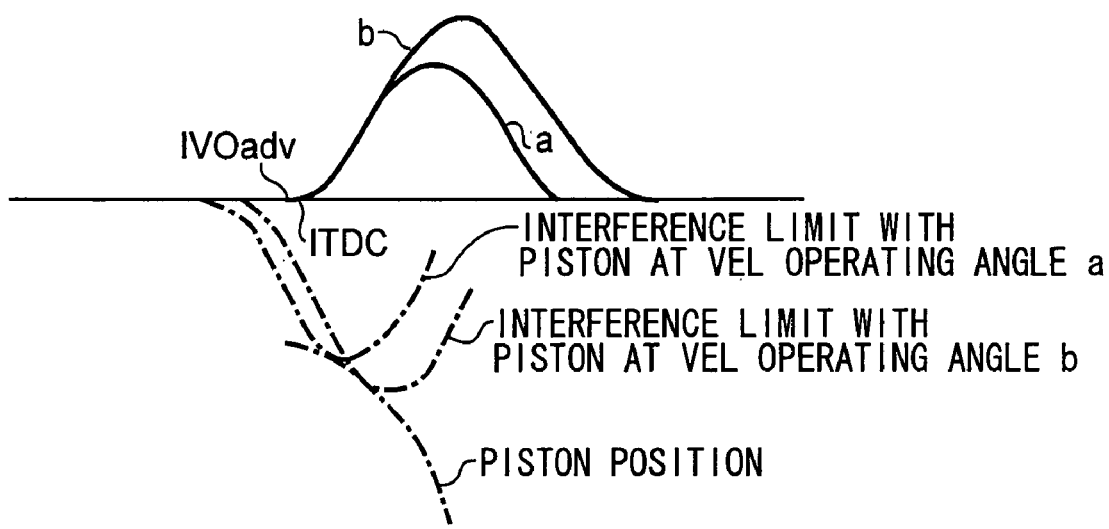
FIGS. 13(A) and (B) are diagrams showing the intake valve control by the variable valve timing mechanism at the time when the variable valve lift mechanism is failed, in the embodiment.
Figure 13:
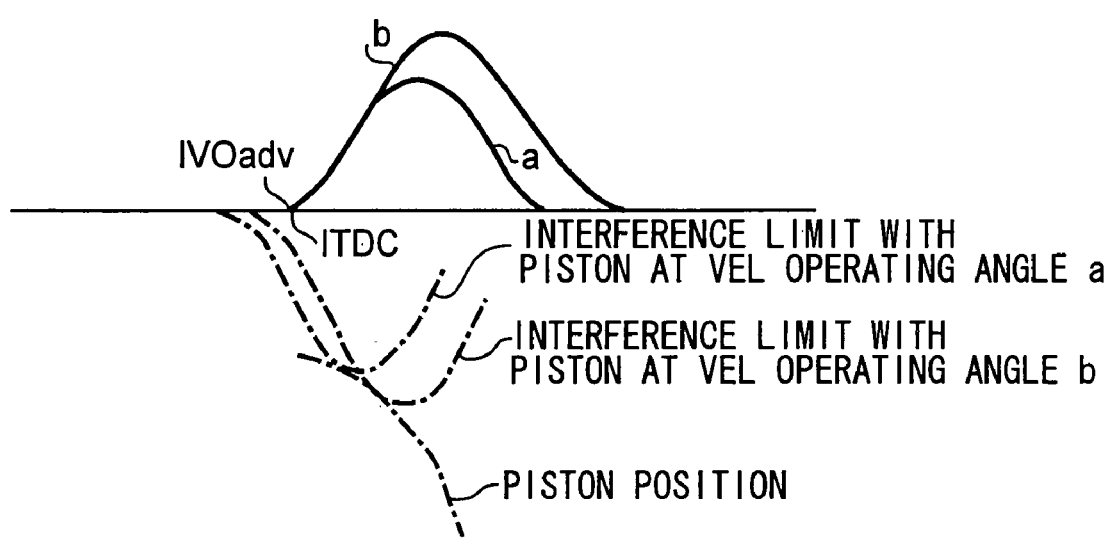

FIG. 13 shows the fail-safe control by variable valve timing mechanism 201 at the time when variable valve lift mechanism 112 is failed.

For example, as shown in (A), in the case where the operating angle at the time when variable valve timing mechanism 201 is failed is positioned on either "a" or "b", the advance limit of valve opening timing IVO in the range where the intake valve does not interfere with the piston is on the advanced side of the intake top dead center ITDC. However, if the valve opening timing is advanced to the advance limit, the remaining burned gas amount due to the overlap of the intake valve with the exhaust valve is increased to deteriorate the combustion stability, so that the fail-safe operation becomes substantially difficult. Therefore, by controlling the valve timing of intake valve 105 by variable valve timing mechanism 201 so that the valve opening timing IVO is limitedly advanced to the advance limit IVOLadv, the remaining burned gas amount can be maintained at the reference value or less while preventing the interference of the intake valve with the piston, to ensure the combustion stability satisfactorily, thereby enabling the fail-safe operation.

On the other hand, as shown in (B), at the deceleration time, if the operating angle center NGVTC at the time when variable valve timing mechanism 201 is failed is on the retarded side, the valve opening timing IVO is too retarded to increase the cylinder negative pressure, thereby leading a possibility of the engine oil loss. Therefore, by controlling the valve timing of intake valve 105 by variable valve timing mechanism 201 so as to forcibly advance the valve opening timing IVO to the retard limit IVOLrtd, the cylinder negative pressure can be held at the predetermined value or less while preventing the interference of the intake valve with the piston, to reliably prevent the engine oil loss, thereby enabling the fail-safe operation.

The entire contents of Japanese Patent Application No. 2003-181091 filed on Jun. 25, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed are:

1. A fail-safe control apparatus for an internal combustion engine, comprising:
   a plurality of variable valve characteristic mechanisms which vary different operating characteristics of an intake valve; and
   a control unit that controls said plurality of variable valve characteristic mechanisms, wherein said control unit:
   detects whether or not there is a failure with respect to said plurality of variable valve characteristic mechanisms;
   when it is detected that any of the variable valve characteristic mechanisms fails in varying an operating characteristic of the intake valve, sets a limit for advancing the opening timing of the intake that (a) is on the retarded side of an advance limit of a range in which the intake valve does not interfere with its associated piston, and (b) maintains a remaining burned gas amount, which exists at the time when another valve operating characteristic is varied by a normally operable one of the plurality of variable valve characteristic mechanisms, at a reference value or less that substantially prevents deterioration of combustion stability; and
   controls the operating characteristics of the intake valve, while limiting the opening timing of the intake valve by said set limit for advancing the opening timing of the intake valve, by way of the normally operating variable valve characteristic mechanism.

2. A fail-safe control apparatus for an internal combustion engine, comprising:
   a plurality of variable valve characteristic mechanisms which vary different operating characteristics of an intake valve; and
   a control unit that controls said plurality of variable valve characteristic mechanisms, wherein said control unit:
   detects whether or not there is a failure with respect to said plurality of variable valve characteristic mechanisms;
   when it is detected that any of the variable valve characteristic mechanisms fails in varying an operating characteristic of the intake valve, sets a limit for retarding the opening timing of the intake value that enables, a cylinder negative pressure, which exists at the time when another valve operating characteristic is varied by a normally operable one of the plurality of variable valve characteristic mechanisms, to be maintained at a predetermined value or less; and
   controls the operating characteristics of the intake valve, while limiting the opening timing of the intake valve by said set limit for retarding the opening timing of the intake valve, by way of the normally operating variable valve characteristic mechanism.

3. A fail-safe control apparatus for an internal combustion engine, comprising:
   a plurality of variable valve characteristic mechanisms which vary different operating characteristics of an intake valve; and
   a control unit that controls said plurality of variable valve characteristic mechanisms, wherein said control unit:
   detects whether or not there is a failure with respect to said plurality of variable valve characteristic mechanisms;
   when it is detected that any of the variable valve characteristic mechanisms fails in varying an operating characteristic of the intake valve:
   sets a limit for advancing the opening timing of the intake valve that maintains a remaining burned gas amount, which exists at the time when another valve operating characteristic is varied by a normally operable one of the plurality of variable valve characteristic mechanisms, at a reference value or less, and
   sets a limit for retarding the opening timing of the intake valve that enables a cylinder negative pressure, which exists at the time when another valve operating characteristic is varied by a normally operable one of the plurality of variable valve characteristic mechanisms, to be maintained at a predetermined value or less; and controls the operating characteristics of the intake valves, while limiting the opening timing of the intake valve by said set limit for advancing the opening timing of the intake valve and said set limit for retarding the opening timing of the intake valve, by way of a normally operating variable valve characteristic mechanism.

4. A fail-safe control apparatus for an internal combustion engine according to claim 2 or claim 3, wherein said control unit sets a retard limit at the deceleration time to be on the retarded side of a retard limit at the non-deceleration time as the limit for retarding the opening timing of the intake valve.

5. A fail-safe control apparatus for an internal combustion engine according to claim 2 or claim 3, wherein one of the variable valve characteristic mechanisms is for varying a lift amount as one of the operating characteristics of the intake valve, and wherein said control unit sets said retard limit to be on the retarded side at the low lift time compared to the high lift time, when the variable valve characteristic mechanism which varies the valve characteristic other than the lift amount of the intake valve is failed and the lift amount of the intake valve is controlled by the variable valve characteristic mechanism which varies the lift amount.

6. A fail-safe control apparatus for an internal combustion engine according to claim 3 or claim 4, wherein said control unit sets said limit for retarding the opening timing of the intake valve as a limit value at which the cylinder negative pressure (absolute pressure) at the deceleration time exceeds −650 mmHg.

7. A fail-safe control apparatus for an internal combustion engine according to claim 1, claim 2 or claim 3, wherein said plurality of variable valve characteristic mechanisms which vary the different operating characteristics of the intake valve consist of:
a mechanism which varies opening/closing timing of the intake valve; and
a mechanism which varies a lift amount of the intake valve.

8. A fail-safe control method for an internal combustion engine equipped with a plurality of variable valve characteristic mechanisms which vary different operating characteristics of an intake valve, comprising the steps of:

detecting whether or not there is a failure with respect to said plurality of variable valve characteristic mechanisms;

setting, when it is detected that any of the variable valve characteristic mechanisms fails in varying an operating characteristic of the intake valve, a limit for advancing the opening timing of the intake valve that is (a) is on the retarded side of an advance limit of a range in which the intake valve does not interfere with its associated piston, and (b) maintains a remaining burned gas amount, which exists at the time when another valve operating characteristic is varied by a normally operable one of the plurality of variable valve characteristic mechanisms, at a reference value or less that substantially prevents deterioration of combustion stability; and controlling the operating characteristics of the intake valve, while limiting the opening timing of the intake valve by said set limit for advancing the opening timing of the intake valve, by way of the normally operating variable valve characteristic mechanism.

9. A fail-safe control method for an internal combustion engine equipped with a plurality of variable valve characteristic mechanisms which vary different operating characteristics of an intake valve, comprising the steps of:

detecting whether or not there is a failure with respect to said plurality of variable valve characteristic mechanisms;

setting, when it is detected that any of the variable valve characteristic mechanisms fails in varying an operating characteristic of the intake valve, a limit for retarding the opening timing of the intake valve that enables a cylinder negative pressure, which exists at the time when another valve operating characteristic is varied by a normally operable one of the plurality of variable valve characteristic mechanisms, to be maintained at a predetermined value or less; and controlling the operating characteristics of the intake valves, while limiting the opening timing of the intake valve by said set limit for retarding the opening timing of the intake valve, by way of the normally operating variable valve characteristic mechanism.

10. A fail-safe control method for an internal combustion engine equipped with a plurality of variable valve characteristic mechanisms which vary different operating characteristics of an intake valve, comprising the steps of:

detecting whether or not there is a failure with respect to said plurality of variable valve characteristic mechanisms;

setting, when it is detected that any of the variable valve characteristic mechanisms fails in varying an operating characteristic of the intake valve:
a limit for advancing the opening timing of the intake valve that maintains a remaining burned gas amount, which exists at the time when another valve operating characteristic is varied by a normally operable one of the plurality of variable valve characteristic mechanisms, at a reference value or less, and
a limit for retarding the opening timing of the intake valve that enables a cylinder negative pressure, which exists at the time when another valve operating characteristic is varied by a normally operable one of the plurality of variable valve characteristic mechanisms, to be maintained at a predetermined value or less, and
controlling the operating characteristics of the intake valve, while limiting the opening timing of the intake valve by said set limit for advancing the opening timing of the intake valve and said set limit for retarding the opening timing of the intake valve, by way of a normally operating variable valve characteristic mechanism.

11. A fail-safe control method for an internal combustion engine according to claim 9 or claim 10, wherein said step of setting the limit for retarding the opening timing of the intake valve, which is capable of maintaining the cylinder negative pressure at the predetermined value or less, sets a retard limit at the deceleration time to be on the retarded side of a retard limit at the non-deceleration time as the limit for retarding the opening timing of the intake valve.

12. A fail-safe control method for an internal combustion engine according to claim 9 or claim 10, wherein one of the variable valve characteristic mechanisms is for varying a lift amount as one of the operating characteristics of the intake valve, and wherein said step of controlling the operating characteristics of the intake valve by the normally operating variable valve characteristic mechanism sets said retard limit to be on the retarded side at the low lift time compared to the high lift time, when the variable valve characteristic mechanism which varies the valve characteristic other than the lift amount of the intake valve is failed and the lift amount of the intake valve is controlled by the variable valve characteristic mechanism which varies the lift amount.

13. A fail-safe control method for an internal combustion engine according to claim 9 or claim 10,
wherein said step of setting the limit for retarding the opening timing of the intake valve, which is capable of maintaining the cylinder negative pressure at the predetermined value or less sets said limit for retarding the opening timing of the intake valve as a limit value at which the cylinder negative pressure (absolute pressure) at the deceleration time exceeds −650 mmHg.

14. A fail-safe control method for an internal combustion engine according to claim 8, claim 9 or claim 10,
wherein said plurality of variable valve characteristic mechanisms which vary the different operating characteristics of the intake valve consist of:
a mechanism which varies opening and closing timing of the intake valve; and
a mechanism which varies a lift amount of the intake valve.

* * * * *